(12) United States Patent
Ogawa (10) Patent No.: US 7,202,860 B2
(45) Date of Patent: Apr. 10, 2007

(54) COORDINATE INPUT DEVICE WORKING WITH AT LEAST DISPLAY SCREEN AND DESK-TOP SURFACE AS THE POINTING AREAS THEREOF

(75) Inventor: Yasuji Ogawa, Tokyo (JP)

(73) Assignees: eIT Co., Ltd., Tokyo (JP); Xiroku Inc., Tsukuba (JP)

( * ) Notice: Subject to any disclaimer, the term of this patent is extended or adjusted under 35 U.S.C. 154(b) by 437 days.

(21) Appl. No.: 10/266,087

(22) Filed: Oct. 7, 2002

(65) Prior Publication Data

US 2003/0085871 A1    May 8, 2003

(30) Foreign Application Priority Data

Oct. 9, 2001    (JP)    ............... 2001-311142

(51) Int. Cl.
G09G 5/00    (2006.01)
G09G 5/08    (2006.01)

(52) U.S. Cl. .................. 345/175; 345/156; 345/173; 345/179

(58) Field of Classification Search ........ 345/156–184; 178/18.09; 354/15–173
See application file for complete search history.

(56) References Cited

U.S. PATENT DOCUMENTS

| | | | |
|---|---|---|---|
| 5,248,856 A * | 9/1993 | Mallicoat ............... | 178/18.09 |
| 5,434,370 A * | 7/1995 | Wilson et al. ........... | 345/179 |
| 5,436,639 A * | 7/1995 | Arai et al. .............. | 345/156 |
| 5,917,490 A * | 6/1999 | Kuzunuki et al. ....... | 345/775 |
| 6,005,547 A * | 12/1999 | Newman et al. ........ | 345/156 |
| 6,043,805 A * | 3/2000 | Hsieh .................... | 345/158 |
| 6,104,387 A * | 8/2000 | Chery et al. ............ | 345/179 |
| 6,456,280 B2 * | 9/2002 | Holtzman ............... | 345/173 |
| 6,587,099 B2 * | 7/2003 | Takekawa ............... | 345/175 |
| 6,710,770 B2 * | 3/2004 | Tomasi et al. .......... | 345/168 |
| 6,760,009 B2 * | 7/2004 | Omura et al. ........... | 345/157 |
| 2002/0021287 A1 * | 2/2002 | Tomasi et al. .......... | 345/168 |
| 2002/0060669 A1 * | 5/2002 | Sze ....................... | 345/173 |
| 2002/0145595 A1 * | 10/2002 | Satoh .................... | 345/173 |
| 2004/0108990 A1 * | 6/2004 | Lieberman et al. ..... | 345/156 |
| 2005/0088424 A1 * | 4/2005 | Morrison et al. ....... | 345/173 |

FOREIGN PATENT DOCUMENTS

| | | |
|---|---|---|
| JP | 7-230352 | 8/1995 |
| JP | 9-212686 | 8/1997 |
| JP | 9-231004 | 9/1997 |
| JP | 11-73271 | 3/1999 |
| JP | 2001-290585 | 10/2001 |

\* cited by examiner

*Primary Examiner*—Bipin Shalwala
*Assistant Examiner*—David L. Lewis
(74) *Attorney, Agent, or Firm*—Foley & Lardner LLP (57) ABSTRACT

A coordinate input device includes a pair of cameras positioned in an upper left position and an upper right position of a display screen of a monitor lying close to a plane extending from the display screen of the monitor and views both a side face of an object in contact with a position on the display screen and a predetermined desk-top coordinate detection area to capture the image of the object within the field of view. The coordinate input device also includes a control circuit which calculates the coordinate value of a pointing tool, pointing to a position within a coordinate detection field, based on video signals output from the pair of cameras, and transfers the coordinate value to a program of a computer.

10 Claims, 8 Drawing Sheets

LEFT CAMERA     RIGHT CAMERA

FIG. 6B

LEFT CAMERA     RIGHT CAMERA

COORDINATE INPUT DEVICE WORKING WITH AT LEAST DISPLAY SCREEN AND DESK-TOP SURFACE AS THE POINTING AREAS THEREOF

BACKGROUND OF THE INVENTION

1. Field of the Invention

The present invention relates to input devices such as a mouse, a touch panel, and a pen input device and, more particularly, to a coordinate input device which permits a user to perform a pointing operation on both the display screen of a monitor and the top surface of a desk.

2. Description of the Related Art

A conventional optical digitizer includes a pair of line cameras mounted on the upper left and the upper right positions of a display screen of a monitor, and processes video signals picked up by the cameras which capture the image of the surface along the display screen. The digitizer thus detects the position of a user's finger or a pen. An outline frame is arranged on the periphery of the display screen so that no unwanted light is incident on the cameras.

When such a technique is applied on the monitor of a personal computer for use on the desk top, the display screen is operated using a finger or a pen like a touch panel. This arrangement permits the user to operate the personal computer in an intuitive fashion.

The display screen of the monitor is typically placed to be vertical to the desk top. Inputting characters and drawings through hand-writing forces the user to be in an uncomfortable position often for a long period of time, thereby fatiguing the user.

When touch input is performed on the display screen, the user's finger or the pan, if placed in the vicinity of the display screen, triggers an unintended input operation. This is because the system detects a touch input at the moment the pen enters the outline frame having a certain width in the image of the camera having the field of view covering the outline frame.

SUMMARY OF THE INVENTION

Accordingly, it is an advantage of the present invention to resolve the above-referenced problem.

A coordinate input device of the present invention connected to a computer allows a user to operate the computer. The user uses a pointing tool such as a finger or a pen while viewing the display screen of a monitor on a desk top. A coordinate detection field of the pointing tool such as the finger and the pen includes at least both the display screen of the monitor and a predetermined desk-top coordinate detection area on the desk top. The coordinate input device includes a pair of cameras positioned on the upper left position and the upper right position lying close to a plane extending from the display screen of the monitor and views both the side face of an object in contact with any position on the display screen and the predetermined desk-top coordinate detection area to capture the image of any object within the field of view thereof, and a control circuit which calculates the coordinate value of the pointing tool, such as the finger and the pen, pointing to a position within the coordinate detection field, based on video signals output from the pair of cameras, and transfers the coordinate value to a program of the computer.

To resolve the problem that an unintended input operation is performed even with the display screen untouched, the coordinate input device may further include a reflective outline frame formed of a member having a high reflectance and a member having a low reflectance running side by side along three sides of the display screen except the top side of the display screen so that a border line between the two members comes within the fields of view of the two cameras, and a touch detector in the control circuit for detecting a touch input on the display screen when the pointing tool such as the finger or the pen crosses the border line.

Preferably, the pointing tool such as the pen includes a retroreflection member at the tip thereof, wherein each of the pair of cameras includes an illumination unit in the vicinity of an imaging lens thereof for illuminating the coordinate detection field, and the cameras receive light reflected from the retroreflection member in response to light emitted from the illumination unit.

Preferably, the coordinate input device further includes the display screen which is integrated with the two cameras in a unitary structure.

In each of the above arrangements, the control circuit is a unit separate from the computer calculates coordinates, and the calculated coordinates are then input to the computer. Alternatively, the video signals from the cameras are directly input to the computer. In this case, the control unit is formed of a driver software program running on the computer and the computer itself.

When the user's finger or the pen touches the display screen, the two cameras on the upper left and upper right positions capture the image of the user's finger or the pen in contact with the display screen from the side thereof. The control circuit processes the captured video signals, thereby determining the angle made between the line connecting the touch position of the user's finger or the pen to each camera and the base line extending between the two cameras. In response to the angle, the control circuit determines the coordinates of the touch position based on the triangulation. The coordinates of the touch position on the display screen are then transferred to a software program running on the computer.

When the user's finger or the pen is placed on a predetermined detection area on a desk, the control circuit processes the captured video signal from the two cameras to determine the coordinates of the tip of the user's finger or the pen. The control circuit then transfers the coordinate value to the program running on the computer.

When a certain application program is initiated, the user may directly touch the screen with his finger or the pen, or may touch the predetermined area on the desk with his finger or the pen. The user may directly touch the screen to select a menu item, or may work with the pen on the desk top to perform hand-written character recognition. This arrangement lightens the fatigue on the user, and assures a smooth and comfortable operation.

BRIEF DESCRIPTION OF THE DRAWINGS

FIGS. 4A–4C show images captured by left and right cameras, wherein

FIGS. 6A and 6B show the strength of a signal of a horizontal line of pixels as a portion of the image captured by the cameras, wherein

DESCRIPTION OF THE PREFERRED EMBODIMENTS

Figure 1:
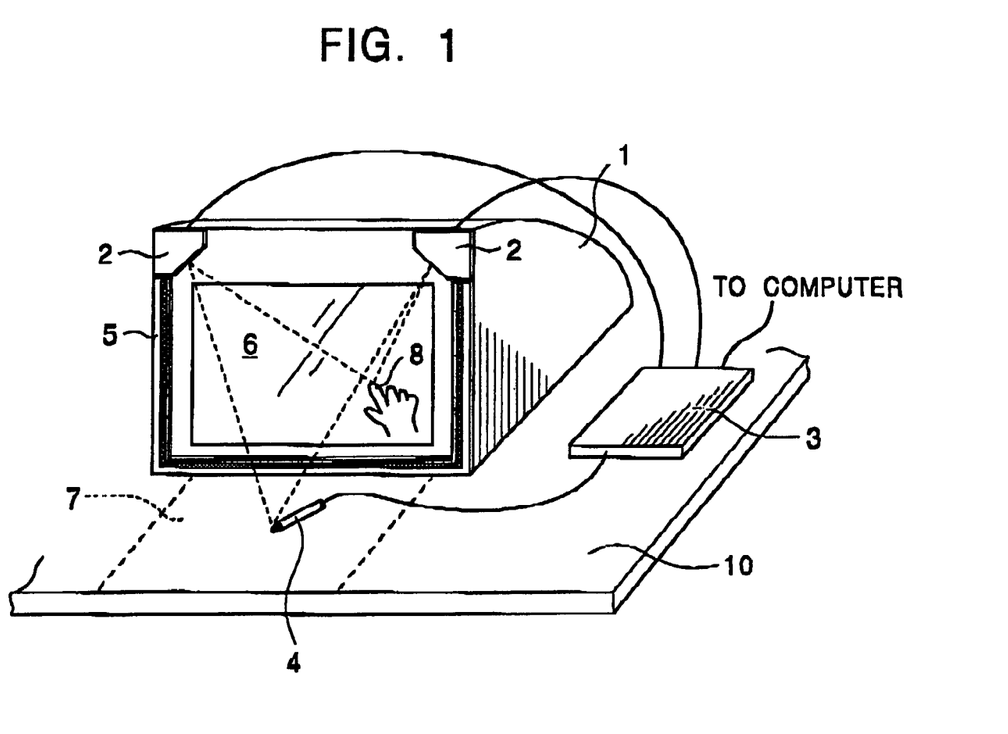
FIG. 1 is a perspective view of the coordinate input device of the present invention.
Figure 2:
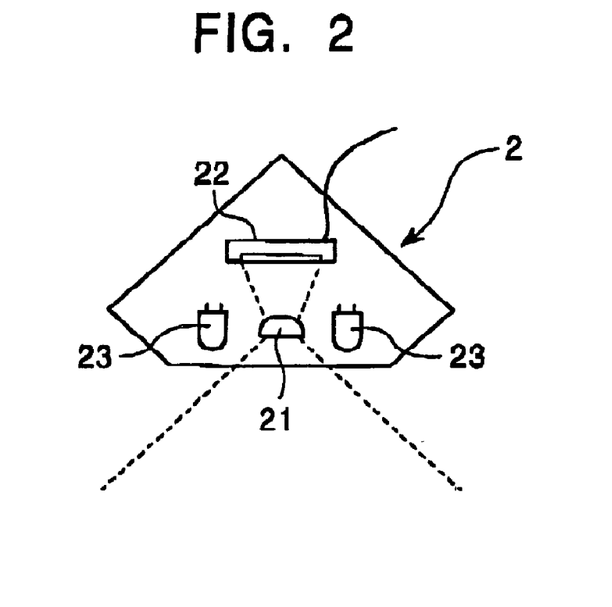
FIG. 2 is an enlarged view of a camera for use in the coordinate input device of the present invention.

The embodiments of the present invention will now be discussed with reference to the drawings. FIG. 1 illustrates a preferred embodiment of a coordinate input device of the present invention. A display unit 1 connected to a computer is placed on a desk 10. The display screen 6 of the display unit 1 is positioned to be substantially vertical to the top surface of the desk 10. The display unit 1 includes two cameras 2 on the upper left and upper right positions of the display screen 6. In an enlarged view of the camera in FIG. 2, the camera 2 includes an imaging lens 21 and an area-image sensor 22. The imaging lens 21 is a wide-angle lens with an angle of view of about 90 degrees. The center axis of the field of view of each camera extends to a diagonally opposite corner of the display screen in parallel with the display screen. Infrared emitting diodes 23 for emitting infrared light are arranged close to the imaging lens 21, and illuminate the surrounding area of the display screen 6 and the top surface of the desk 10.

Figure 3:
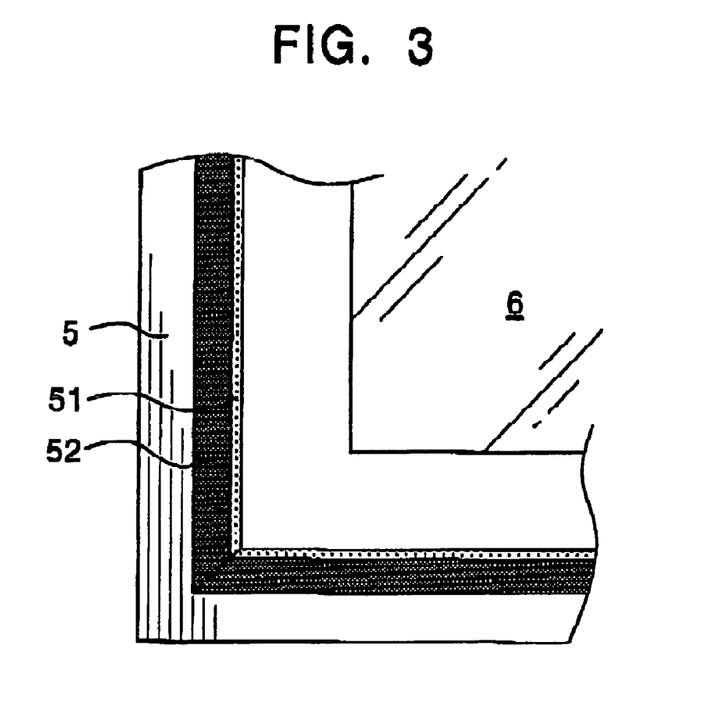
FIG. 3 is an enlarged view of the reflective outline frame used in the coordinate input device of the present invention.

The display unit 1 has a reflective outline frame 5 on three sides of the display screen 6 as shown in FIG. 1. A narrow-width retroreflection tape 51 is arranged near the display screen 6 on the reflective outline frame 5 as shown in FIG. 3. A non-reflective reflective black tape 52 is attached on the reflective outline frame 5 along and in contact with the retroreflection tape 51. The retroreflection tape 51 is a member which efficiently reflects light in the same direction in which the light has come. The retroreflection tape 51 is frequently used as a road sign because it efficiently reflects the light from the road sign to a head light when the head light illuminates the road sign. The retroreflection tape is widely available.

A desk-top coordinate detection area 7 extends on the desk 10 from immediately below the lower edge of the display screen 6 toward the front end of the desk. No mark is required on the desk top. Alternatively, a mark may be attached onto the desk 10 to indicate the desk-top coordinate detection area 7.

Figure 4A:
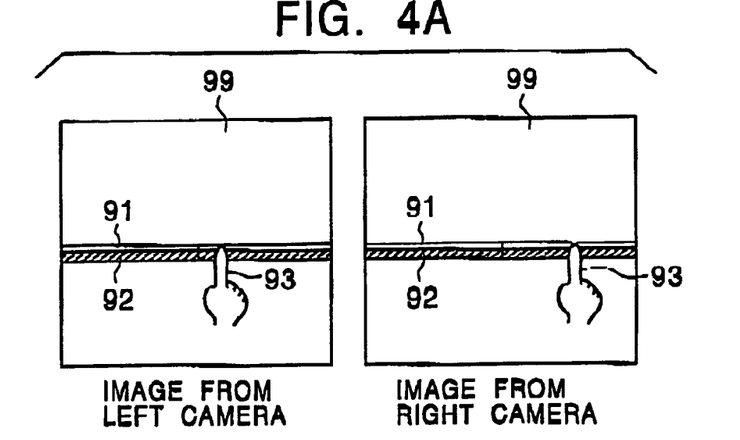
FIG. 4A shows the image when a finger touches the display screen.
Figure 4B:
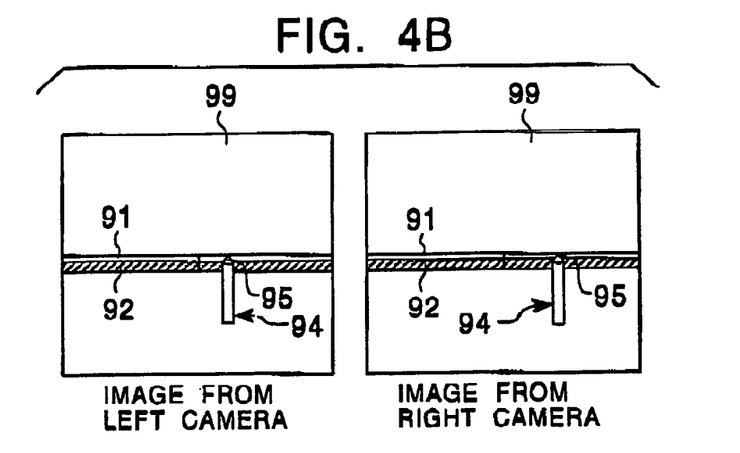
FIG. 4B shows the image when a pen touches the display screen.
Figure 4C:
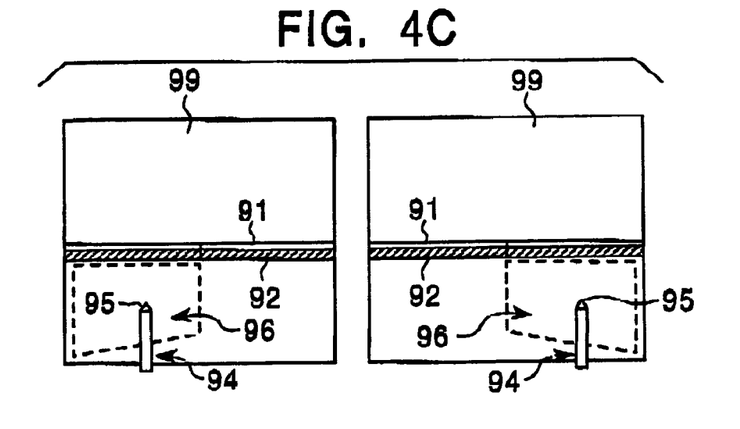
FIG. 4C shows the image when the pen touches a predetermined desk-top coordinate detection area.

FIGS. 4A–4C show images captured by left and right cameras, wherein FIG. 4A shows the image when a finger 8 touches the display screen 6, FIG. 4B shows the image when a pen 4 touches the display screen 6, and FIG. 4C shows the image when the pen 4 touches the desk-top coordinate detection area 7.

Figure 5:
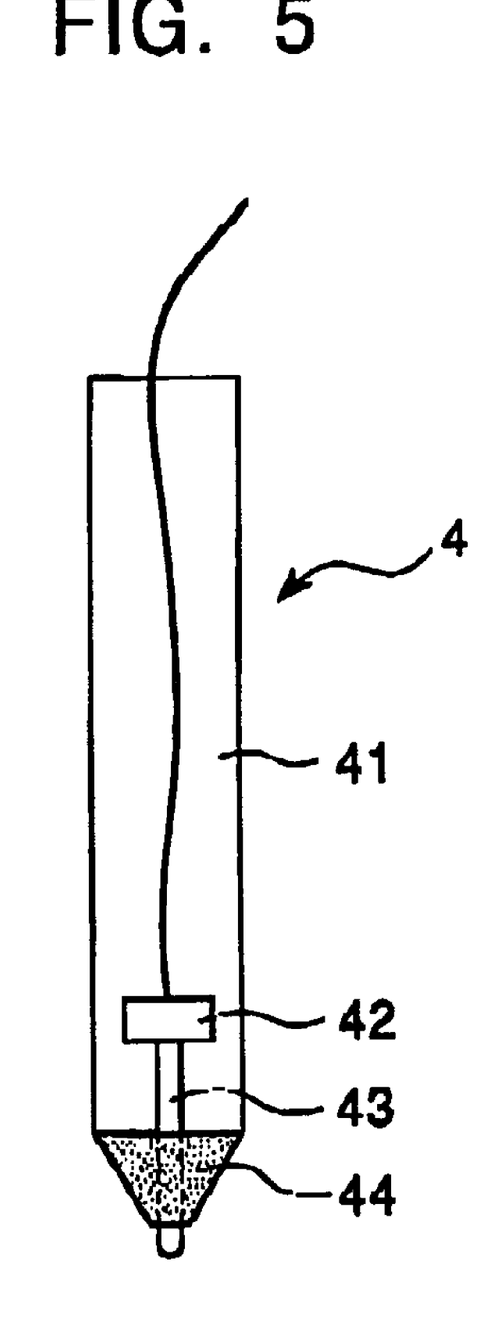
FIG. 5 is an enlarged perspective view of the pen used in the coordinate input device of the present invention.

FIG. 5 illustrates in detail the pen 4 used in the coordinate input device of the present invention. A pen tip member 43 is exposed from the end of a pen body 41, and is connected to a pressure sensor 42 within the pen body 41. The output signal from the pressure sensor 42 is sent to a control circuit 3 via a cable. A retroflection tape 44 is wrapped around the pen body 41 on the end portion thereof.

The operation of the input device with the user's finger 8 in touch with the display screen 6 is now discussed. The image captured by the camera with the user's finger 8 in touch with the display screen 6 is shown in FIG. 4A. Since the camera 2 is set up so that the center axis of field of view is aligned with a side of a plane close to the display screen, and an image area 99 internal to the plane is not used. The image of the reflective outline frame 5 with sharp black and white contrast is presented behind the image 93 of the user's finger. The retroreflection tape 51 is arranged on the inner side of the reflective outline frame 5, namely, close to the display screen 6. The retroreflection tape 51 efficiently reflects the light from the infrared emitting diodes 23 arranged close to the camera 2, and the reflected light is then picked up as a strong white signal. The image 93 of the user's finger is imaged as a shadow over the image 91 of the retroreflection tape 51.

Figure 6A:
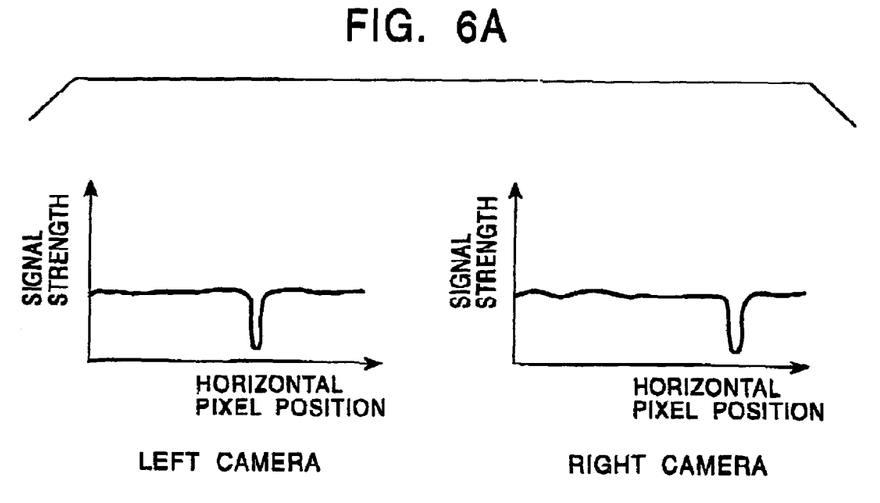
FIG. 6A shows the signal strength of the horizontal line of pixels in response to the image of a retroreflection tape in the vicinity of the image of a border line of the reflective outline frame when the finger touches the display screen.
Figure 7:
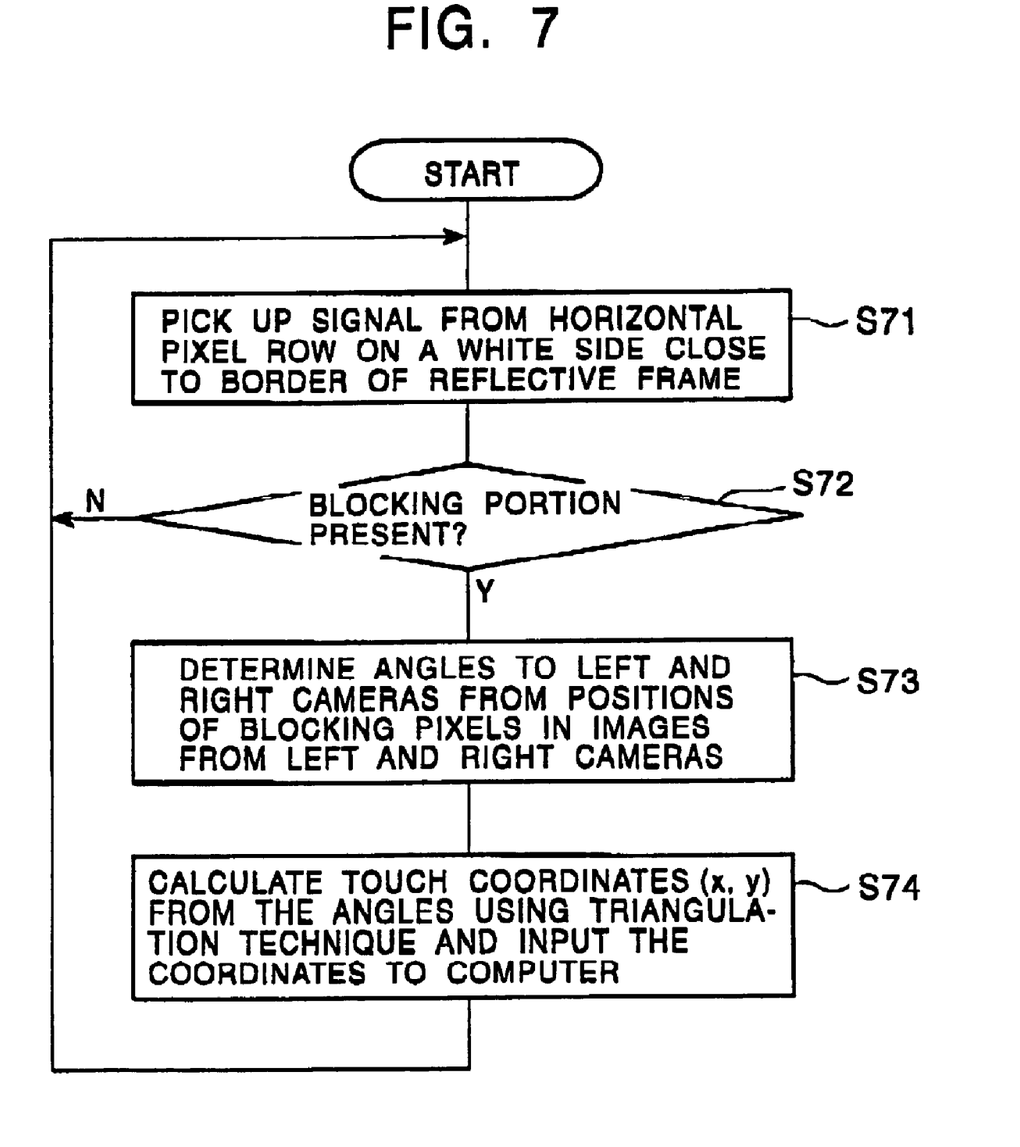
FIG. 7 is a flow diagram showing the procedure of a control circuit for detecting the coordinates of a touch position when the finger touches the display screen.

The video signals from the two cameras are fed to the control circuit 3 as shown in FIG. 1. The control circuit 3 detects the border between the white and black portions of the reflective outline frame 5, namely, the image of the border between the image 91 of the retroreflection tape 51 and the image 92 of the black tape 52, thereby picking up a horizontal line of pixels closer to the white portion from the image of the border. FIG. 6A shows the signal of the line of pixels. The line of pixels contains information related to a location where the user's finger 8 is in contact with the display screen 6. The control circuit 3 determines the coordinates of the touch position in the procedure represented in FIG. 7, and the coordinate value is then sent to the computer.

Figure 6B:
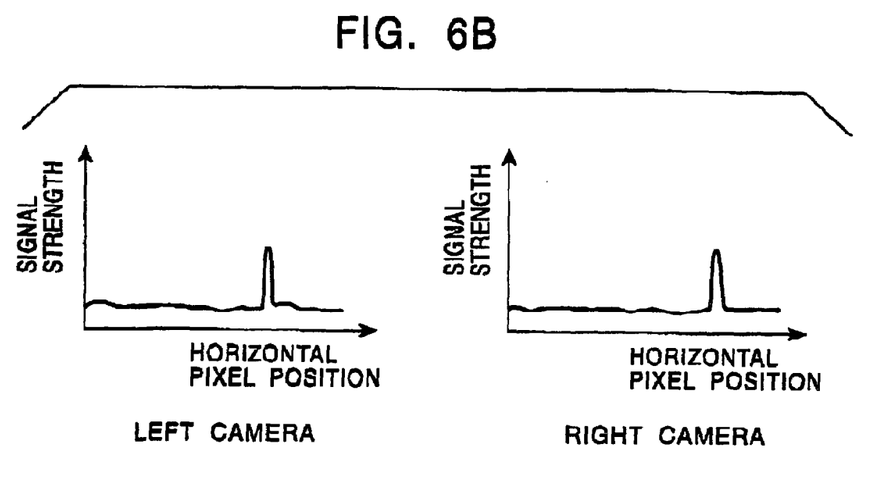
FIG. 6B shows the signal strength of the horizontal line of pixels in response to the image of a black tape in the vicinity of the image of a border line of the reflective outline frame when the pen touches the display screen.
Figure 8:
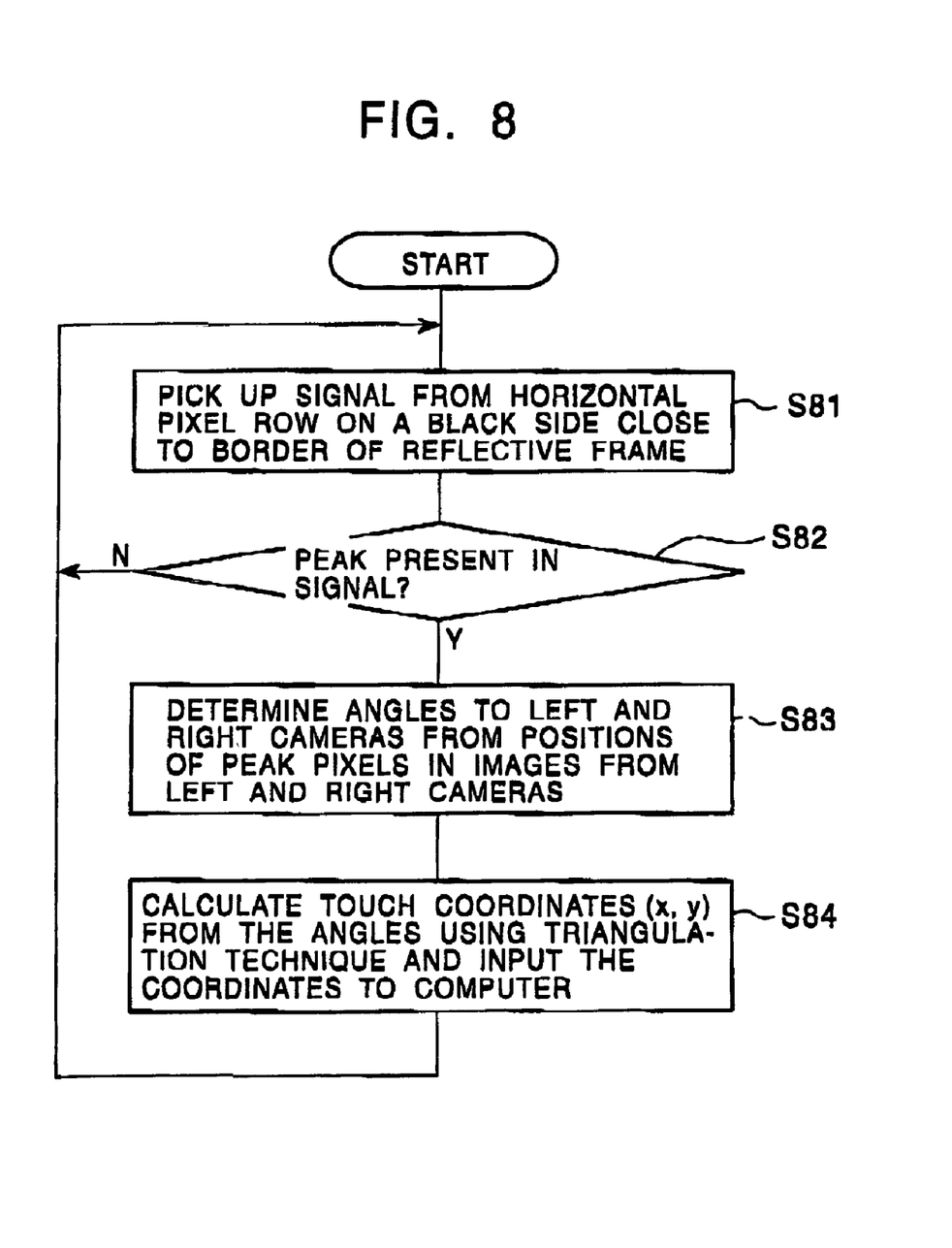
FIG. 8 is a flow diagram showing the procedure of a control circuit for detecting the coordinates of a touch position when the pen touches the display screen.

The operation of the control circuit 3 with the pen 4 in touch with the display screen 6 will now be discussed. When the pen 4 touches the display screen 6, the image shown in FIG. 4B is captured by the cameras. Unlike the user's finger, the retroflection tape 44 is wrapped around the tip of the pen, and the light reflected therefrom is strong enough to be registered as a white signal. The resulting image is not discriminated from the image 91 of the retroreflection tape 51. However, the resulting image is easily discriminated from the image 92 of the black tape as the non-reflective portion of the reflective outline frame. A line of pixels slightly closer to the black side from the border line is selected. The signal of the line of pixels is shown in FIG. 6B. Since the signal of the line of pixels contains information relating to the location where the pen 4 is in contact with the display screen 6. The control circuit 3 determines the coordinate value of the touch position of the pen 4 in the procedure shown in FIG. 8. The coordinate value is then sent to the computer.

The operation of the input device with the pen 4 in contact with the desk-top coordinate detection area 7 will now be discussed. FIG. 4C shows the image captured by the cameras. Each of the cameras 2 captures the entire image of a desk-top coordinate detection area 96, and the image 95 of the pen tip falling with the desk-top coordinate detection area 96 is shown. The camera 2 captures the image of the pen tip from diagonally above the pen, and in normal use of the pen, the hand of the user holding the pen does not overshadow the pen tip 44.

Figure 9:
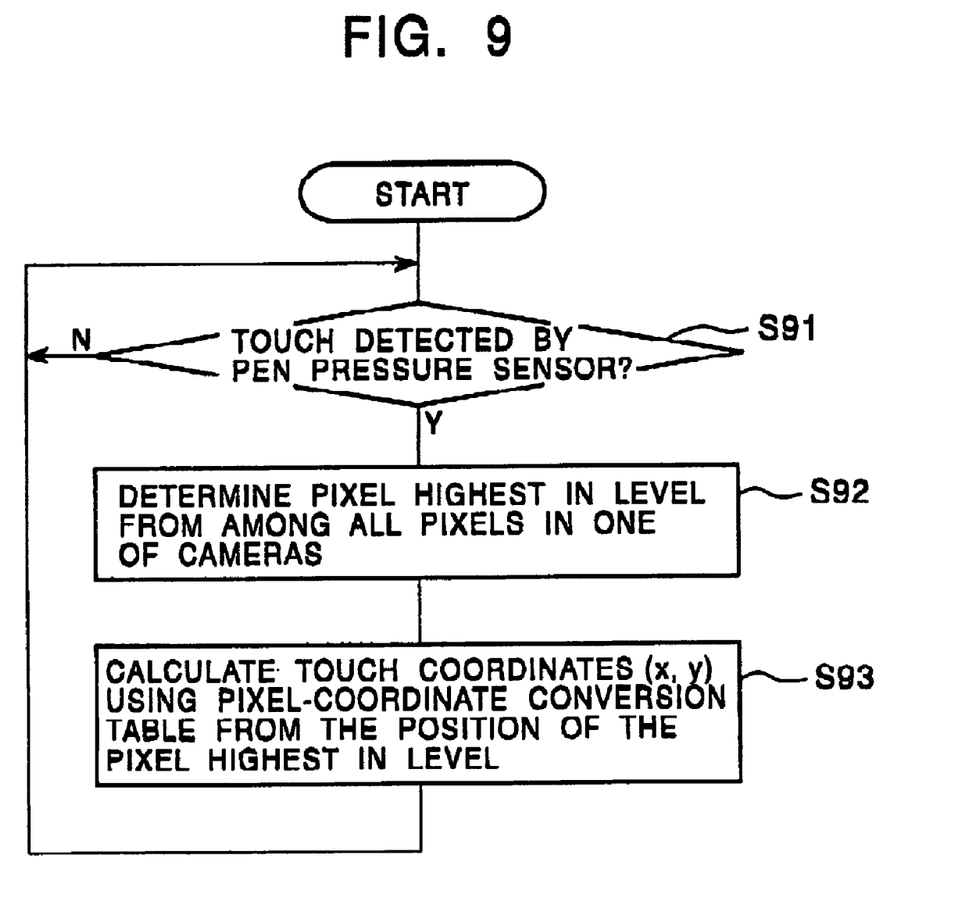
FIG. 9 is a flow diagram showing the procedure of a control circuit for detecting the coordinates of a touch position when the pen touches the predetermined desk-top coordinate detection area on a desk.

Referring to FIG. 9, the control circuit 3 determines a pixel that provides a signal at the highest signal level from the entire image (step S92). Since the retroflection tape 44 reflects the strongest light to the camera 2 when being illuminated by the infrared emitting diodes 23 of the camera 2, the pixel indicates the location of the pen tip. Using the location information of the pixel at the highest signal level out of the video signal of one of the two cameras, the control circuit 3 determines the coordinates of the pen tip through an equation represented by the procedure shown in FIG. 9 (step S93). The coordinate value is then sent to the computer.

The output signal of the pressure sensor 42 connected to the pen tip member 43 is fed to the control circuit 3. When the pen 4 touches the desk-top coordinate detection area 7, the control circuit 3 easily detects from the output signal that the pen 4 touches the desk-top coordinate detection area 7.

The coordinate input device of the present invention is not limited to the above embodiment. A variety of modifications is possible without departing from the scope of the present invention.

In the above embodiment, the display screen 6 is vertical to the top surface of the desk 10. The display screen 6 may be tilted by some inclination by performing a simple calibration on the coordinate value of the desk-top coordinate detection area 7. The present invention is not limited to the above-referenced embodiment. For example, the cameras 2 may be arranged in an attachment device. Specifically, the cameras 2 may be housed in a case separate from the display unit 1, and then may be mounted on any display device. The touch signal of the pen 4 may be sent in a wireless fashion rather than using a cable. A radio transmitter may be housed in the pen and a radio receiver may be housed in the control circuit with no cable used.

In accordance with the coordinate input device of the present invention, the fields of view of the cameras mounted on the upper left and the upper right positions of the display screen are widened to cover not only the plane along the display screen but also an area of the desk top. The coordinates pointed on the desk top by the finger or the pen are detected so that the pointing operation becomes possible on the desk top. The user-friendliness of the computer operable with the finger or the pen is substantially improved.

The reflective outline frame formed of a member having a high reflectance and a member having a low reflectance running side by side along three sides of the display screen is arranged except the top side of the display screen so that a border line between the two members comes within the fields of view of the two cameras. The control circuit includes a touch detector for detecting a touch input on the display screen when the pointing tool such as the finger or the pen crosses the border line. In this arrangement, the touch input is stably detected in the vicinity of the display screen.

The reflective outline frame formed of a member having a high reflectance and a member having a low reflectance running side by side along three sides of the display screen is arranged except the top side of the display screen so that a border line between the two members comes within the fields of view of the two cameras. In this arrangement, both the pen having a high reflectance and the finger having a low reflectance are used for pointing on the display screen.

The pointing tool such as the pen has the retroreflection member on the tip thereof, and an illumination unit is arranged in the vicinity of the image lens to illuminate the entire coordinate detection area. The light reflected from the retroreflection member is received by the cameras. Without the need for complex image processing, the pointing tool such as the pen is recognized by detecting a pixel presenting the brightest signal. A low-cost and reliable coordinate input device results.

With such a coordinate input device incorporated in a display screen, an easy-to-install and compact coordinate input device or the display unit is provided.

What is claimed is:

1. A coordinate input device comprising:
   a pair of cameras positioned in an upper left position and an upper right position of a display screen of a monitor lying close to a plane extending from the display screen of the monitor and views both a side face of an object in contact with a position on the display screen and a predetermined desk-top coordinate detection area to capture the image of the object within a field of view, each of the pair of cameras including infrared emitting diodes in the vicinity of an image lens for illuminating a coordinate detection field;
   a reflective outline frame formed of a member having a high reflectance and a member having a low reflectance running side by side along three sides of the display screen except a top side of the display screen so that a border line providing a sharp white and black contrast between the two members comes within the field of view of the two cameras; and
   a control circuit which calculates the coordinate value of a pointing tool pointing to a position within the coordinate detection field, based on video signals output from the pair of cameras, and transfers the coordinate value to a program of a computer, the positioning tool being selected from the group consisting of a user's finger and a pen which has a retroreflection member at its tip.

2. The coordinate input device according to claim 1, further comprising a display screen which is integrated with the pair of cameras in a unitary structure.

3. The coordinate input device according to claim 1, wherein the coordinate detection field includes the display screen of the monitor and the predetermined desk-top coordinate detection area.

4. The coordinate input device according to claim 1, further comprising a touch detector in the control circuit for detecting a touch input on the display screen when the pointing tool crosses the border line.

5. The coordinate input device according to claim 1, wherein the cameras receive light reflected from the retroreflection member in response to light emitted from the infrared emitting diodes.

6. The coordinate input device according to claim 1, wherein the control unit is separate from the computer.

7. A coordinate input device comprising:
   means for capturing an image positioned in an upper left position and an upper right position of a display screen of a monitor lying close to a plane extending from the display screen of the monitor and viewing both a side face of an object in contact with a position on the display screen and a predetermined desk-top coordinate detection area to capture the image of the object within a field of view, the means for capturing an image including means for illuminating in the vicinity of an image lens for illuminating a coordinate detection field, means for reflecting formed of a member having a high reflectance and a member having a low reflectance running side by side along three sides of the display screen except a top side of the display screen so that a border line providing a sharp white and black contrast between the two members come within the field of view of the means for capturing an image, and means for calculating the coordinate value of a pointing tool pointing to a position within the coordinate detection field, based on video signals output from the means for capturing an image, and transferring the coordinate value to a program of a computer, the positioning tool being selected from the group consisting of a user's finger and a pen which has a retroreflection member as its tip.

8. The coordinate input device according to claim 7, wherein the coordinate detection field includes the display screen of the monitor and the predetermined desk-top coordinate detection area.

9. The coordinate input device according to claim 7, further comprising a touch detector means in the means for calculating the coordinate value of the pointing tool, for detecting a touch input on the display screen when the pointing tool crosses the border line.

10. The coordinate input device according to claim 7, wherein the means for capturing an image receives light reflected from the retroreflection member in response to light emitted from the means for illuminating.

* * * * *

UNITED STATES PATENT AND TRADEMARK OFFICE
CERTIFICATE OF CORRECTION

PATENT NO.         : 7,202,860 B2                                              Page 1 of 1
APPLICATION NO. : 10/266087
DATED                 : April 10, 2007
INVENTOR(S)        : Yasuji Ogawa It is certified that error appears in the above-identified patent and that said Letters Patent is hereby corrected as shown below:

IN THE SPECIFICATION:

Column 3, line 50, please change "non-reflective reflective black tape" to --non-reflective black tape--.

IN THE CLAIMS:

Column 7, Claim 7, please change "member as" to --member at--.

Signed and Sealed this

Eighth Day of January, 2008

JON W. DUDAS
*Director of the United States Patent and Trademark Office*